UNITED STATES PATENT OFFICE.

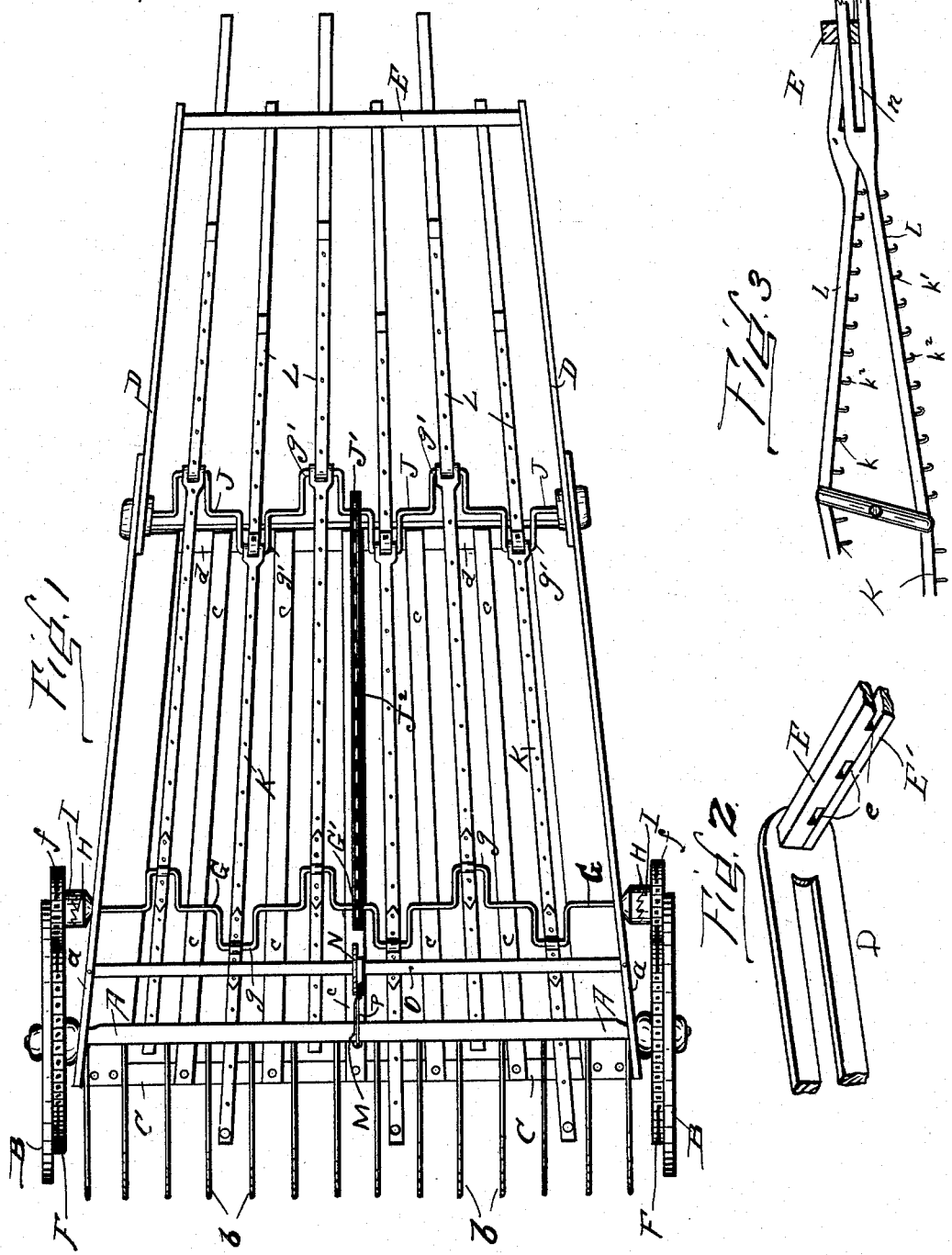

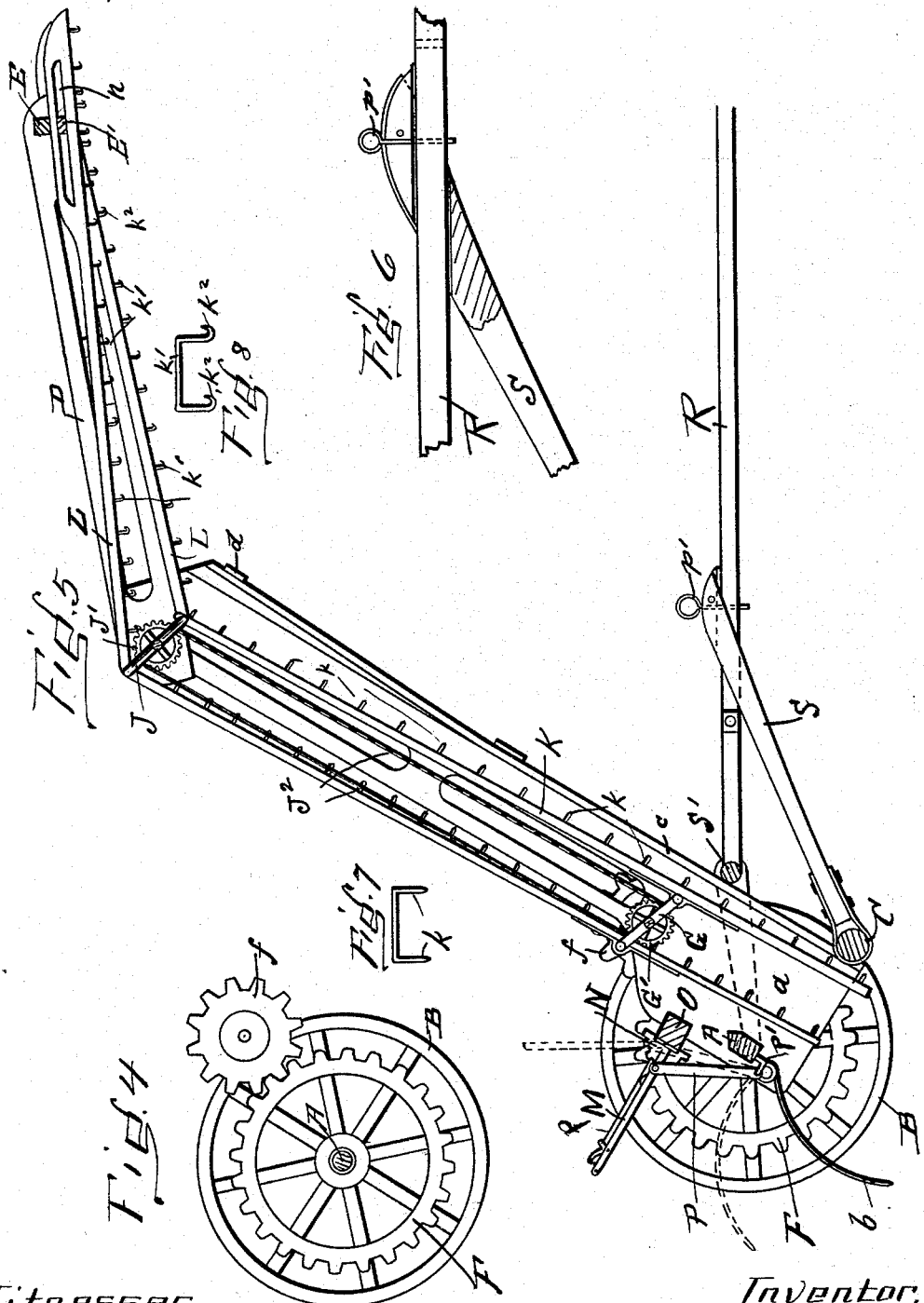

IRA E. STUMP, OF RICHVILLE, ASSIGNOR OF ONE-HALF TO JOSEPH E. VAN NOSTRAN, OF CANTON, OHIO.

HAY-LOADER.

SPECIFICATION forming part of Letters Patent No. 518,555, dated April 17, 1894.

Application filed December 4, 1893. Serial No. 492,687. (No model.)

*To all whom it may concern:*

Be it known that I, IRA E. STUMP, a citizen of the United States, residing at Richville, in the county of Stark and State of Ohio, have invented certain new and useful Improvements in Hay-Loaders; and I do hereby declare that the following is a full, clear, and exact description of the same, reference being had to the annexed drawings, making a part of this specification, and to the letters of reference marked thereon, in which—

Figure 1, is a top view of the loader, showing the different parts properly located and arranged. Fig. 2, is a view, showing a portion of the front or overhead cross-bar, and illustrating a portion of one of the upper side bars. Fig. 3, is a view, showing two of the upper vibrating bars and illustrating the same properly journaled to the cranks. Fig. 4, is a view showing one of the traveling wheels, and a set of gear wheels. Fig. 5, is a longitudinal section of the loader. Fig. 6, is a view showing a portion of the tongue and the adjusting bar properly located thereon. Figs. 7 and 8, are detached views of the elevating teeth.

The present invention has relation to hay loaders, and it consists in the different parts, and combination of parts hereinafter described and particularly pointed out in the claims.

Similar letters of reference indicate corresponding parts in all of the figures of the drawings.

In the accompanying drawings, A represents the combined rake head and axle, which rake head is properly journaled to the bottom or lower ends of the side flanges $a$, and extends through the flanges $a$ a sufficient distance to provide suitable bearings for the traveling wheels B.

To the combined rake head and axle A, are securely attached in any convenient and well known manner the curved rake teeth $b$, which teeth may be of the ordinary kind, such as are commonly used in spring toothed rakes.

To the bottom or under sides of the flanges $a$, and the bottom or lower ends of said flanges is securely attached the cross-bar C, to which cross-bar are securely attached the slats $c$, which slats extend upward and their top or upper ends securely attached to the cross-bar $d$.

It will be understood that any desired number of cross-bars, such as $d$ may be used to securely hold the slats in a rigid condition, and prevent said slats from springing or sagging, all of the bars $d$ being securely attached to the bottom or under sides of the side flanges or bars $a$.

The side flanges or bars $a$, the slats $c$, the cross-bars $d$, and the cross-bar C constitute the elevating frame proper, and said parts when properly constructed and adjusted are arranged substantially as illustrated in Fig. 1.

To the top or upper ends of the flanges or side bars $a$ are securely attached in any convenient manner the forward extending arms D, which arms may be of any desired length. To the front or forward ends of the arms D is attached the cross-bar E, which cross-bar is provided with the openings or notches $e$, which openings or notches are for the purpose hereinafter described.

To the traveling wheels B are securely attached in any convenient and well known manner, the gear wheels F, which gear wheels mesh with and communicate rotary motion to the pinions $f$, said pinions being loosely mounted upon the crank shaft G, to which crank shaft is securely attached the spring ratchets H, which ratchets interlace with the ratchets I, said ratchets being for the purpose of allowing the pinions $f$ to rotate upon the crank shaft G during the time the traveling wheels B move backward, thereby leaving the crank shaft at rest, and as the traveling wheels move forward the pinions $f$ will communicate rotary motion to the crank shaft G.

To the top or upper ends of the flanges or side bars $a$ is properly journaled the crank shaft J, which crank shaft is located substantially as illustrated in Figs. 1 and 5.

The crank shafts G and J are each provided with the compound or oppositely timed cranks $g$ and $g'$.

To the cranks $g$ are properly journaled the bottom or lower portions of the elevating bars K, and the top or upper ends of said bars properly journaled to the cranks $g'$, which cranks and bars are located and arranged substantially as shown in Fig. 1. To the cranks $g'$ are journaled the rear ends of the reciprocating bars L, and for the purpose of bringing the elevating bars K, and the reciprocating bars L in proper alignment, the top or upper ends of the elevating bars K are bifurcated, and the reciprocating bars placed in the bifurcations. For the purpose of supporting the front or forward ends of the reciprocating bars L, the bars E and E' are provided.

To the crank shaft G is attached the sprocket wheel G' which sprocket wheel should be made in sections or halves, and the halves properly united together.

Upon the crank shaft J is located the sprocket wheel J', which is constructed in the same manner as the sprocket wheel G'. The object of the sprocket wheel is to communicate rotary motion to the crank shaft J by means of the sprocket chain $J^2$.

For the purpose of causing the crank shafts G and J to rotate in unison, the sprocket wheels G' and J' are formed of the same size and have the same number of teeth, or in other words said sprocket wheels should be duplicates.

The elevating bars K are each provided with the teeth $k$, which teeth may be formed substantially as shown in Fig. 7, which form shows two teeth formed of a single piece of metal.

The reciprocating bars L are provided with the teeth $k'$ which teeth are provided with hooks $k^2$, said hooks being for the purpose of temporarily holding the hay in an elevated position, and at the same time allowing the hay to drop upon the load as the reciprocating bars move back and forth.

It will be understood that the elevating bars K should be so adjusted that as they move downward they will be carried upward or away from the slats $c$ and as said elevating bars move upward they will be brought down toward the slats thereby causing the hay to be elevated.

For the purpose of adjusting the rake teeth $b$ to or from the ground, the operating lever M is provided, which operating lever is pivotally attached to the segment N, said segment being attached to the cross-bar O.

To the operating lever M is pivotally connected the link P, which link extends rearward, and is attached to the arm P'.

For the purpose of holding the rake teeth $b$ at any desired point of adjustment the bar $p$ is provided, the bottom or lower end of which engages the teeth of the segment N.

For the purpose of supporting the front or forward ends of the vibrating bars L, and at the same time allowing said bars to move back and forth, the slots $n$ are provided, which slots receive the cross-bar E'.

It will be understood that the cross-bars E and E' should be formed of two pieces, or in other words said bars should be formed separate and attached together by means of clamping bolts after the reciprocating bars L have been properly adjusted.

For the purpose of providing a means for attaching the hay loader proper to the rear end of a wagon, the tongue R is provided. And for the purpose of adjusting the inclination of the loader, the bar S is provided, the top or upper end of which is adjusted along the tongue and set at the desired point of adjustment by means of the pin $p'$. It will be understood that the rear end of the tongue and the rear end of the bar S, should be pivotally connected to the cross-bars S' and C or their equivalents.

For the purpose of carrying the hay over the load and causing the same to be distributed along the length of the load, the reciprocating bars L, are located at an angle to the elevating frame proper, and should be substantially horizontal. The hooked teeth being for the purpose of temporarily holding the hay. The openings $e$ are for the purpose of receiving the forward ends of the bars L.

Having fully described my invention, what I claim as new, and desire to secure by Letters Patent, is—

1. The combination of the rake head A, having attached thereto the rake teeth $b$, the flanges $a$, the traveling wheels B having fixed thereto the gear wheels F, the pinions $f$ loosely mounted on the crank shaft G, the crank shafts G and J provided with cranks $g$ and $g'$, the elevating-bars K provided with teeth, the reciprocating bars L journaled to the crank-shaft J and provided with hooked teeth, the bars E and E', the forward extending arms D carrying the cross-bars E and E' and means for communicating uniform movement to the crank-shafts, substantially as and for the purpose specified.

2. The combination of a traveling frame, provided at its top or upper end with forward extending bars or arms, an axle provided with rake teeth, reciprocating bars L located at an angle to the elevating bars K, the tongue R, journaled at its rear end to the cross-bar, the bar S, and the pin $p'$, substantially as and for the purpose specified.

In testimony that I claim the above I have hereunto subscribed my name in the presence of two witnesses.

IRA E. STUMP.

Witnesses:
U. S. JOHNSTON,
E. A. C. SMITH.